(12) United States Patent
Lambert (10) Patent No.: US 10,471,822 B2
(45) Date of Patent: Nov. 12, 2019

(54) VENTILATION FLAP ASSEMBLY FOR A VEHICLE

(71) Applicant: WEIDPLAS GMBH, Küsnacht (CH)

(72) Inventor: Sven Lambert, Rüti (CH)

(73) Assignee: WEIDPLAS GMBH, Küsnacht (CH)

( * ) Notice: Subject to any disclaimer, the term of this patent is extended or adjusted under 35 U.S.C. 154(b) by 0 days.

(21) Appl. No.: 15/749,244

(22) PCT Filed: Jul. 26, 2016

(86) PCT No.: PCT/EP2016/067749
§ 371 (c)(1),
(2) Date: Jan. 31, 2018

(87) PCT Pub. No.: WO2017/021205
PCT Pub. Date: Feb. 9, 2017

(65) Prior Publication Data
US 2018/0229598 A1 Aug. 16, 2018

(30) Foreign Application Priority Data

Jul. 31, 2015 (EP) ..................... 15179308

(51) Int. Cl.
*B60K 11/08* (2006.01)
*B60R 19/52* (2006.01)

(52) U.S. Cl.
CPC ............ *B60K 11/085* (2013.01); *B60R 19/52* (2013.01); *B60R 2019/525* (2013.01); *Y02T 10/88* (2013.01)

(58) Field of Classification Search
CPC .. B60K 11/085; B60R 19/52; B60R 2019/525
See application file for complete search history.

(56) References Cited

U.S. PATENT DOCUMENTS 1,220,794 A 3/1917 Stephenson
1,249,731 A 12/1917 Fekete
(Continued)

FOREIGN PATENT DOCUMENTS

AT 179927 B 10/1954
CN 2272044 Y 1/1998
(Continued)

OTHER PUBLICATIONS

International Search Report for PCT/EP2016/067749 dated Aug. 1, 2017 [PCT/ISA/210].

(Continued)

*Primary Examiner* — Kevin A Lathers
(74) *Attorney, Agent, or Firm* — Sughrue Mion, PLLC (57) ABSTRACT

Disclosed is a ventilation flap assembly for a vehicle, in particular a motor vehicle (8), the assembly having at least one first and one second ventilation flap (2, 2') in addition to an actuating element (3). Each of the first and the second ventilation flaps (2, 2') can be moved from a first position into a second position, in order to allow the passage of a quantity of air, which differs in the second position in comparison to the quantity of air in the first position, through an air opening (83, 84) of the vehicle. The actuating element (3) is used to move both the first and the second ventilation flaps (2, 2') and said actuating element (3) is designed, when actuated, to firstly move the first ventilation flap (2) from its first position into its second position and only then to move the second ventilation flap (2') from its first position into its second position.

14 Claims, 10 Drawing Sheets

(56) References Cited

U.S. PATENT DOCUMENTS

| | | | |
|---|---|---|---|
| 1,480,095 A | 1/1924 | Moller | |
| 1,570,111 A | 1/1926 | Wickware | |
| 1,643,192 A | 9/1927 | Yeager | |
| 1,706,338 A | 3/1929 | Workman | |
| 1,737,946 A | 12/1929 | Rood | |
| 1,817,398 A * | 8/1931 | See | B60K 11/085 123/41.04 |
| 1,858,289 A | 5/1932 | Tracy | |
| 1,891,485 A | 12/1932 | Tracy | |
| 2,090,908 A | 8/1937 | Anderson | |
| 2,276,279 A | 3/1942 | Asklund | |
| 2,310,086 A | 2/1943 | Howard | |
| 2,743,796 A | 5/1956 | Focht, Jr. et al. | |
| 2,770,851 A | 11/1956 | Soule | |
| 2,901,961 A | 9/1959 | Cotts | |
| 4,970,947 A | 11/1990 | Soethout | |
| 5,520,579 A | 5/1996 | Saida | |
| 5,732,666 A | 3/1998 | Lee | |
| 5,769,709 A | 6/1998 | Kim | |
| 6,131,336 A | 10/2000 | Krause et al. | |
| 8,973,607 B2 | 3/2015 | Schwarz et al. | |
| 2010/0147611 A1 | 6/2010 | Amano et al. | |
| 2010/0236503 A1 | 9/2010 | Bernt et al. | |
| 2011/0251761 A1 | 10/2011 | Charnesky et al. | |
| 2012/0043146 A1 | 2/2012 | Schneider | |
| 2012/0067655 A1 | 3/2012 | Charnesky et al. | |
| 2012/0111652 A1 | 5/2012 | Charnesky et al. | |
| 2012/0132474 A1 | 5/2012 | Charnesky et al. | |
| 2012/0241128 A1 | 9/2012 | Vacca et al. | |
| 2012/0247018 A1 | 10/2012 | Stokes et al. | |
| 2012/0312611 A1 | 12/2012 | Van Buren et al. | |
| 2013/0001454 A1 | 1/2013 | Schwarz et al. | |
| 2013/0092462 A1 | 4/2013 | Chinta | |
| 2013/0146375 A1 | 6/2013 | Lee | |
| 2014/0232145 A1 | 8/2014 | Lanard et al. | |
| 2014/0248828 A1 | 9/2014 | Schmitt | |
| 2014/0346809 A1 | 11/2014 | Lee et al. | |

FOREIGN PATENT DOCUMENTS

| | | |
|---|---|---|
| DE | 3234519 A1 | 3/1984 |
| DE | 3605064 A1 | 8/1987 |
| DE | 3628449 A1 | 2/1988 |
| DE | 38 36 374 A1 | 1/1990 |
| DE | 3836374 A1 | 1/1990 |
| DE | 8816559 U1 | 1/1990 |
| DE | 4315220 C1 | 5/1994 |
| DE | 69200726 T2 | 4/1995 |
| DE | 19715352 A1 | 10/1998 |
| DE | 19813602 A1 | 10/1998 |
| DE | 19728305 A1 | 1/1999 |
| DE | 29819759 U1 | 4/1999 |
| DE | 198 60 336 A1 | 10/1999 |
| DE | 19850989 C1 | 5/2000 |
| DE | 19910774 A1 | 9/2000 |
| DE | 20118274 U1 | 1/2002 |
| DE | 10130951 A1 | 1/2003 |
| DE | 102005025081 A1 | 1/2007 |
| DE | 102006001797 A1 | 7/2007 |
| DE | 102006001798 A1 | 7/2007 |
| DE | 202008002433 U1 | 6/2008 |
| DE | 102009014003 A1 | 9/2010 |
| DE | 102011015993 A1 | 1/2012 |
| DE | 102010039620 A1 | 2/2012 |
| DE | 102011113227 A1 | 3/2012 |
| DE | 102011117561 A1 | 5/2012 |
| DE | 102011119368 A1 | 5/2012 |
| DE | 102011078461 A1 | 1/2013 |
| DE | 102012218296 A1 | 4/2013 |
| DE | 10 2011 055 394 A1 | 5/2013 |
| DE | 102012106059 A1 | 6/2013 |
| DE | 102012208560 A1 | 11/2013 |
| DE | 102013203563 A1 | 9/2014 |
| DE | 102013110467 A1 | 11/2014 |
| EP | 0 327 740 A1 | 8/1989 |
| EP | 0327740 A1 | 8/1989 |
| EP | 0925983 A1 | 6/1999 |
| EP | 1270286 B1 | 5/2006 |
| EP | 1 974 974 A1 | 10/2008 |
| EP | 2371602 A1 | 10/2011 |
| EP | 2574484 A1 | 4/2013 |
| EP | 2612779 A1 | 7/2013 |
| EP | 2 716 483 A1 | 4/2014 |
| FR | 2757619 A1 | 6/1998 |
| JP | 2008-106982 A | 5/2008 |
| WO | 2005081950 A2 | 9/2005 |
| WO | 2008002264 A1 | 1/2008 |
| WO | 2008014451 A2 | 1/2008 |
| WO | 2011039170 A1 | 4/2011 |
| WO | 2012047528 A2 | 4/2012 |
| WO | 2012160065 A1 | 11/2012 |

OTHER PUBLICATIONS

International Preliminary Report on Patentability with the translation of Written Opinion dated Feb. 15, 2018 issued by the International Bureau in PCT/EP2016/067749.

* cited by examiner

VENTILATION FLAP ASSEMBLY FOR A VEHICLE

CROSS REFERENCE TO RELATED APPLICATIONS

This application is a National Stage of International Application No. PCT/EP2016/067749, filed on Jul. 26, 2016, which claims priority from European Patent Application No. 15179308.0, filed on Jul. 31, 2015, the contents of all of which are incorporated herein by reference in their entirety.

TECHNICAL FIELD

The present invention relates to a ventilation flap assembly for a vehicle, in particular a motor vehicle. The ventilation flap assembly serves for controlling the quantity of air from incoming and/or outgoing air through an air opening of the vehicle.

PRIOR ART

Vehicles and, in particular, motor vehicles, such as for example automobiles, generally have a plurality of air inlet openings and air outlet openings in order to conduct waste air from an interior of the vehicle to the outside or in order to introduce fresh air from outside the vehicle into the interior. An air supply opening may serve, for example, for cooling the engine or the brakes or may be provided for the supply of fresh air into the passenger compartment. Air outlet openings may serve, for example, for discharging waste air from the passenger compartment or from the engine compartment.

In order to be able to control the quantity of incoming and/or outgoing air, it is often desirable if the air inlet opening and air outlet opening are able to be opened and closed. For this reason, ventilation flap assemblies are frequently provided in the regions of the air inlet openings and air outlet openings, said ventilation flap assemblies permitting a continuous closing and/or opening of the corresponding air opening by rotating slat-like ventilation flaps.

In order to be able to ensure always an optimal supply and/or discharge of air, advantageously the ventilation flap assemblies are automatically controllable by a control unit. As a result, the supply and/or discharge of air may be adapted optimally to the requirements which respectively prevail relative to engine cooling or brake cooling, air conditioning, etc.

Ventilation flap assemblies are disclosed in EP 0 327 740 A1 and DE 198 60 336 A1, in which in each case a plurality of ventilation flaps may be adjusted simultaneously by means of a displaceable actuating element. U-shaped recesses are present in the actuating element, lugs attached to the ventilation flaps engaging therein so that with a displacement of the actuating element these lugs are rotated together with the ventilation flaps.

In the ventilation flap assembly shown in DE 101 30 951 A1, the individual ventilation flaps are connected together at the side by means of a control rod, such that by moving the control rod all ventilation flaps are adjustable simultaneously. The ventilation flaps in this case may also be moved into positions in which they are not aligned parallel with one another. However, this ventilation flap assembly has a relatively complicated construction with many movable parts.

For the opening and closing of the air inlet openings and the air outlet openings, drive devices are required, said drive devices having a certain drive force, which has to be applied for adjusting the ventilation flaps, and having to be designed correspondingly. In this case it has to be ensured that the ventilation flaps may be reliably opened and closed even in extreme situations. An extreme situation occurs, for example, when the air inlet openings or air outlet openings are blocked with dirt, stuck together with insects or iced up in winter. Moreover, in particular, the air inlet openings are often arranged on the vehicle such that they are significantly subjected to driving wind and correspondingly the ventilation flaps have to be adjusted against a certain level of air pressure. For adjusting the ventilation flaps, therefore, relatively powerful drive devices have to be used, said drive devices being accordingly costly, having a high energy consumption and requiring considerable space.

DE10 2011 055 394 A1 discloses a ventilation flap assembly in which ventilation flaps of different air inlet openings are adjustable in an unsynchronized manner by means of a single actuating element. In this manner, different air inlet openings may be opened and/or closed by means of a single drive device. Such a ventilation flap control for a plurality of air inlet openings which only uses a single drive device, however, is only suitable for specific situations and when the different air inlet openings are arranged in the vicinity of one another. Moreover, this ventilation flap assembly has a relatively complex design with many components movably connected together. Accordingly, the mounting of this ventilation flap assembly is complicated.

DESCRIPTION OF THE INVENTION

It is, therefore, an object of the present invention to specify a structurally simple ventilation flap assembly for a vehicle in which the ventilation flaps may be adjusted using a small expenditure of force.

To achieve this object, the present invention, therefore, provides a ventilation flap assembly for a vehicle, in particular a motor vehicle, such as for example an automobile, comprising at least a first ventilation flap and a second ventilation flap which in each case can be adjusted from a first position into a second position, in order to allow the passage of quantity of air, which differs and is preferably smaller in the second position in comparison with the quantity of air in the first position, through an air opening of the vehicle; and an actuating element for adjusting both the first and the second ventilation flap.

The actuating element is configured, when actuated, firstly to adjust the first ventilation flap from its first position into its second position, and only then to adjust the second ventilation flap from its first position into its second position.

In other words, when the actuating element is actuated, therefore, the first and the second ventilation flaps are adjusted asynchronously. In the case of the actuation of the actuating element the adjusting movement of the second ventilation flap starts, in particular, only when the adjusting movement of the first ventilation flap has already begun. Preferably, the adjusting movement of the second ventilation flap starts only when the adjusting movement of the first ventilation flap is already complete and the first ventilation flap has already reached its second position.

It is advantageously possible to actuate the actuating element only partially, in order to adjust only the first ventilation flap thereby and to move this flap into its second position, but not the second ventilation flap which in the case of this partial actuation of the actuating element preferably remains in its first position. Advantageously, therefore, the actuating element has an intermediate position in which the first ventilation flap is already in the second position but the second ventilation flap is still in the first position.

Since the first ventilation flap is adjusted firstly and only then is the second ventilation flap adjusted, the adjustment is able to take place with an expenditure of force which as a whole is lower, in particular when the ventilation flap is significantly subjected to driving wind, is iced up or is contaminated with dirt. By the asynchronous adjustment, the dirt adhering to the ventilation flaps may be more easily released and any ice bridges which have formed between the individual ventilation flaps may be broken up using a lower expenditure of force. Since after the adjustment of the first ventilation flap air is already able to flow through the air opening, the air pressure subsequently acting on the second ventilation flap is substantially lower so that this ventilation flap may be adjusted with a lower expenditure of force. The required expenditure of force, i.e. in particular the required torque, is additionally considerably lower relative to the maximum amount when the individual ventilation flaps are adjusted one after the other, than when all ventilation flaps have to be moved together. As a result, a drive unit which is of smaller dimensions, requires less space and is more cost-effective may be used.

The asynchronous adjustment of the ventilation flaps also permits the quantity of air flowing through to be set in a simple and accurate manner, for example by only a portion of the ventilation flaps being moved into the open position whilst the other ventilation flaps are in the closed position.

Advantageously, not only the adjustment of the ventilation flaps from the first position into the second position takes place asynchronously but also the adjustment of the ventilation flaps from the second position into the first position. The asynchronous adjustment movement of the ventilation flaps thus advantageously relates both to the opening and to the closing of the air opening by means of the ventilation flaps. A uniform aesthetic image regarding the adjustment movements is provided thereby to the observer. Moreover, alterations relative to the aerodynamics of the vehicle occur less abruptly.

The first and the second ventilation flaps are preferably in each case of slat-shaped design. More than two preferably slat-shaped ventilation flaps may also be provided, said ventilation flaps, in particular when the actuating element is actuated, being adjusted one after the other, i.e. one ventilation flap after the other. Preferably, in this case the ventilation flaps are adjusted one after the other in the sequence of their spatial arrangement, i.e. the ventilation flaps adjacent to one another are adjusted one after the other, without a ventilation flap being skipped during the adjustment process.

The ventilation flap assembly is preferably configured such that in the course of the actuation the actuating element comes directly or indirectly into contact with the first and/or the second ventilation flap, in particular bears against the first and/or the second ventilation flap in order to adjust the first and/or the second ventilation flap thereby from its first position into its second position. For example, therefore, the ventilation flap assembly may be configured such that in its initial or basic position the actuating element is directly or indirectly already in contact with the first ventilation flap, wherein the second ventilation flap is not yet directly or indirectly in contact with the actuating element. In this variant, therefore, when the actuating element is actuated, the first ventilation flap is adjusted directly from its first position into its second position and the second ventilation flap is adjusted from its first position into its second position, offset chronologically from the movement of the first ventilation flap. This advantageous embodiment of the ventilation flap assembly provides the advantage that the air opening may be opened and/or closed relatively rapidly and with a low expenditure of force.

The actuation of the actuating element takes place, for example, by it being displaced in a translational manner and/or being rotated. In this case, the actuating element may come into contact directly or indirectly, i.e. via further components, with the first and the second ventilation flaps one after the other and thereby adjust these ventilation flaps. However, it is also possible that the actuating element is fixedly connected to the first ventilation flap and only comes into contact with the second ventilation flap during the course of the actuation in order to adjust said second ventilation flap.

According to a preferred embodiment, a first adjusting lever is attached to the first ventilation flap and a second adjusting lever is attached to the second ventilation flap. The actuating element preferably has one or more drive elements which, when the actuating element is actuated, firstly come into contact with the first adjusting lever in order to adjust the first ventilation flap thereby from its first position into its second position and subsequently come into contact with the second adjusting lever in order to adjust the second ventilation flap thereby from its first position into its second position. In this manner, an asynchronous adjustment of the ventilation flaps may be achieved in a very simple manner. By means of a corresponding arrangement and design of the drive element(s) on the actuating element and/or by means of a corresponding design of the adjusting lever(s), the adjustment behavior of the ventilation flaps may also be set and adapted in a very simple manner.

In an embodiment which is particularly simple structurally, in each case the drive elements are formed by a projection provided on the actuating element. Advantageously, the projections which form the drive elements respectively extend in this case perpendicularly away from an outer surface of the actuating element. Preferably, the drive elements are connected in one piece to the actuating element. In such an embodiment with an actuating element which has drive elements formed by projections, the adjusting levers may be configured in a particularly simple manner. Thus the adjusting levers in each case may in particular be formed by an element of geometrically simple design, such as for example a pin-shaped or cuboidal element which in the radial direction protrudes outwardly from the rotational axis of the corresponding ventilation flap.

Advantageously the drive element(s) are configured to hold the ventilation flaps, after the adjustment, in their respective second position. Preferably, to this end the drive element(s) have in each case a first stop surface in order to adjust at least one of the ventilation flaps from its first position into its second position, as well as a second stop surface in order to hold in each case said ventilation flap, after the adjustment, in its second position. The first stop surface and the second stop surface in this case are advantageously arranged with their surface normals substantially perpendicular to one another. The embodiments cited in this paragraph of the ventilation flap assembly provide the advantage that the locking of the ventilation flaps in their second positions, in particular their closed positions, is particularly effective.

The actuating element may comprise a first drive element and a second drive element, wherein the first drive element serves for coming into contact with the first adjusting lever, in order to adjust the first ventilation flap thereby, and the second drive element serves for coming into contact with the second adjusting lever, in order to adjust the second ventilation flap thereby.

If the actuating element has a plurality of drive elements, said drive elements, in particular, may be substantially arranged on a straight line. However, said drive elements may also be substantially arranged on a circle. Depending on the arrangement of the drive elements, the actuating element is preferably displaced in a translational manner or rotated for actuation, in order to ensure an optimal transmission of force from the actuating element to the ventilation flaps. For adjusting the ventilation flaps the actuating element may, in particular, be displaceable relative thereto substantially in a straight line in a direction of displacement. Advantageously, the ventilation flaps are arranged substantially parallel to one another and the direction of displacement extends substantially perpendicular to the longitudinal extent of the ventilation flaps and, in particular, in the plane formed by the parallel ventilation flap assembly.

In an arrangement of the drive elements on a circle, the actuating element is advantageously configured as a rotating wheel. This produces an optimal transmission of force from the rotating wheel to the drive elements when said drive elements are arranged on a circle. According to a development of the invention, the ventilation flaps may be arranged in a star-shaped manner and are then adjustable, in particular, by means of an actuating element in the form of a rotating wheel.

Advantageously, the ventilation flaps in each case are acted upon by a force, in particular a spring force, acting in the direction of the first position. This permits a particularly simple construction of the ventilation flap assembly.

The position and the second position of the ventilation flaps advantageously differ from one another in each case by the ventilation flaps in the second position being rotated by ca. 90° in comparison with the first position. This provides the advantage that a maximally large quantity of air may be passed through the air opening. The rotation preferably takes place about the longitudinal axes of the ventilation flaps, i.e. generally about one respective axis which extends in the maximum direction of extent of the ventilation flap.

Preferably, the first positions of the ventilation flaps in each case constitute open positions and the second positions of the ventilation flaps in each case constitute closed positions. In the open positions, advantageously a maximally large quantity of air is passed through the air opening and in the closed positions a maximally small quantity is passed through. If the first position constitutes an open position, it is ensured that in the basic position, which generally is the case in the first position, air may flow through the air opening. This provides the advantage that cool air may always be supplied to the vehicle in the basic position of the ventilation flaps and/or in the normal case. The first positions of the ventilation flaps, however, may in each case also constitute closed positions and the second positions may constitute open positions. Preferably, by adjusting the first and the second ventilation flaps, in each case the quantity of air flowing through a single air opening is able to be altered.

Advantageously, the first, the second and any further ventilation flaps are held together in a frame which has an air through-opening which is able to be fully or at least substantially closed and/or opened by means of these ventilation flaps. In the case of an air through-opening which is only substantially closed, it is ensured that when a large proportion or all of the ventilation flaps are in the closed position and, for example, due to a defect said ventilation flaps are no longer movable into the open position, a specific residual quantity of cool air may still be supplied to the vehicle. In a parallel arrangement of the ventilation flaps, the frame and, in particular, the air through-opening thereof are generally configured to be rectangular, and in the case of a star-shaped ventilation flap assembly, general round, in particular circular.

In a preferred embodiment, the actuating element comprises a slot which is penetrated by a first element attached to the first ventilation flap and by a second element attached to the second ventilation flap. Whilst the ventilation flaps may then be arranged on one side of the actuating element, the adjusting levers attached thereto may be arranged on the other side of the actuating element remote from the ventilation flaps. The actuating element, therefore, may be located, in particular, between the ventilation flaps and the adjusting levers. In this embodiment of the ventilation flap assembly, the adjusting levers are easily replaceable.

The invention further relates to a vehicle, in particular a motor vehicle, having one or more ventilation flap assemblies, as specified above.

BRIEF DESCRIPTION OF THE DRAWINGS

Preferred embodiments of the invention are described hereinafter with reference to the drawings, which merely serve for the description and are not to be interpreted as limiting. In the drawings:

FIG. 2a shows a side view of the ventilation flap assembly shown in FIG. 1a;

FIG. 3 shows an exploded view of the ventilation flap assembly shown in FIG. 1a;

DESCRIPTION OF PREFERRED EMBODIMENTS

In the various embodiments and variants shown in FIGS. 1a to 19, elements which have identical or similar functions are provided in each case with the same reference numerals.

A first embodiment of a ventilation flap assembly according to the invention is shown in FIGS. 1a to 4. In this embodiment, three slat-shaped ventilation flaps 2, 2', 2" are held together in a rectangular frame 1. The frame 1 has a similarly rectangular air through-opening 15 which, depending on the rotational position of the ventilation flaps 2, 2', 2", is closed or opened thereby. Naturally for fulfilling this function, just two or more than three ventilation flaps 2 could be provided.

The frame 1 is formed by two longitudinal walls 12 arranged parallel to one another and by two side walls 11 arranged parallel to one another. The two longitudinal walls 12 extend in a longitudinal direction of the frame 1 and are in each case connected together at their ends via the side walls 11 attached thereto.

The ventilation flaps 2, 2', 2" as mentioned above are configured in the manner of slats and have in each case an aerodynamic profile perpendicular to their longitudinal extent. Due to this aerodynamic profile the air resistance against the air which flows through the air through-opening 15 is minimal when the flap position is open. The ventilation flaps 2, 2', 2" in each case are held on both sides in the side walls 11 of the frame 1 and at the same time are freely rotatable relative to the frame 1 about a rotational axis which extends in the longitudinal direction of the frame 1 and in the longitudinal direction of the ventilation flaps 2, 2', 2".

In a direction perpendicular to their longitudinal direction, the three ventilation flaps 2, 2', 2" in each case have a width which is slightly larger than a third of the width of the air through-opening 15 measured in the same direction when the flap position is closed. In the longitudinal direction the ventilation flaps 2, 2', 2" are configured in each case to be slightly shorter than the air through-opening 15 in the longitudinal direction of the frame 1. In this manner, with a corresponding position of the ventilation flaps 2, 2', 2" the air through-opening 15 is able to be closed thereby. The ventilation flaps 2, 2', 2" thus have in each case a closed position which, for example, is adopted in FIG. 1b by the ventilation flap 2 illustrated uppermost therein, and an open position which in FIG. 1b is adopted by the lower two ventilation flaps 2', 2".

Figure 3:
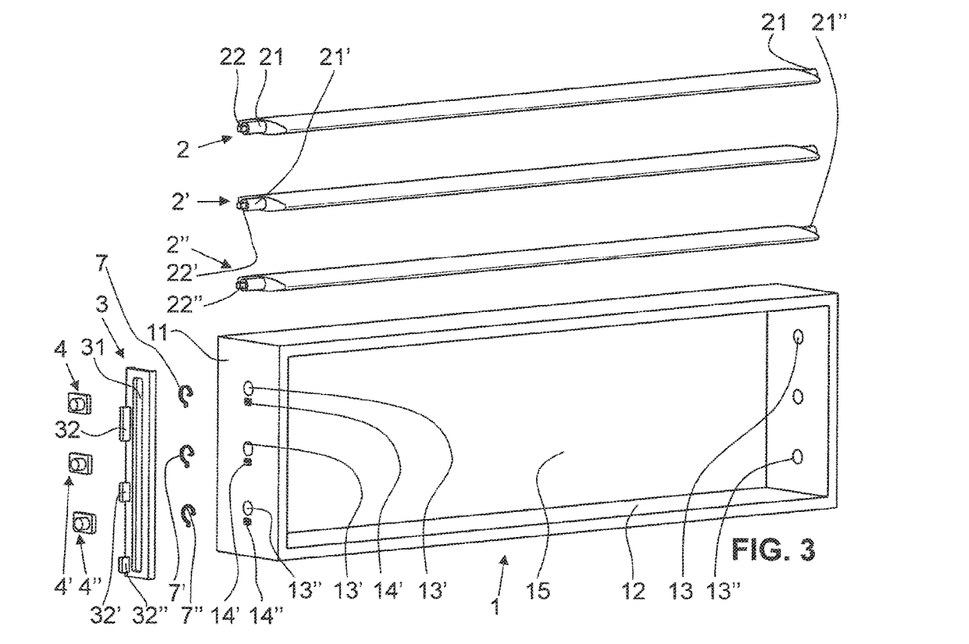

As may be identified in FIG. 3, in each case fastening pins 21, 21', 21" are attached to the ends of the ventilation flaps 2, 2', 2" on both sides. The fastening pins 21, 21', 21" in each case are substantially centrally arranged relative to the profile and/or the cross-sectional surface of the ventilation flaps 2, 2', 2" and define the rotational axis thereof. For mounting the ventilation flaps 2, 2', 2" in the frame 1 said fastening pins 21, 21', 21" in each case are inserted into correspondingly configured mounting holes 13, 13', 13" which are provided in the side wall 11 of the frame. In the fully mounted state of the ventilation flaps 2, 2', 2", the fastening pins 21, 21', 21" penetrate the mounting holes 13, 13', 13" in each case at least partially, preferably fully. The retention of the fastening pins 21, 21', 21" in the mounting holes 13, 13', 13" permits the ventilation flaps 2, 2', 2" to rotate freely and independently of one another in the frame 1.

A square coupling element 22, 22', 22" is attached in each case to one side of the ventilation flaps 2, 2', 2" at the front end of the fastening pins 21, 21', 21" (see FIG. 3). This coupling element serves for attaching in each case one adjusting lever 4, 4', 4" to the ventilation flap 2, 2', 2". To this end, the adjusting levers 4, 4', 4" have in each case a correspondingly designed recess, not visible in the figures, which serves for receiving a square coupling element 22, 22', 22". The adjusting levers 4, 4', 4" may, in particular, be pressed onto the square coupling element 22, 22', 22" in order to be fixed positively and non-positively to the ventilation flaps 2, 2', 2". The adjusting levers 4, 4', 4" in each case are attached fixedly in terms of rotation onto the ventilation flaps 2, 2', 2", so that by rotating the adjusting levers 4, 4', 4" the ventilation flaps 2, 2', 2" may be rotated about their rotational axis.

The adjusting levers 4, 4', 4" have a respectively rectangular shape with two longitudinal sides and two broad sides and with an upper face and a lower face facing the ventilation flaps 2, 2', 2". The lower faces are in each case configured to be flat with the exception of a recess which serves for receiving one of the square coupling elements 22, 22', 22". The recess is arranged centrally between the two longitudinal sides of the adjusting lever 4, 4', 4" in the vicinity of one of the broad sides of the adjusting lever 4, 4', 4". Due to this decentralized arrangement of the recess overall, the adjusting levers 4, 4', 4" attached to the ventilation flaps 2, 2', 2" in each case have a protruding actuating region 41, 41', 41", the respective ventilation flap 2, 2', 2" being able to be rotated thereby and thus adjusted about its rotational axis extending through the recess. In the upper face, which is otherwise configured to be flat, the opposing recess forms a corresponding raised portion.

Figure 4:
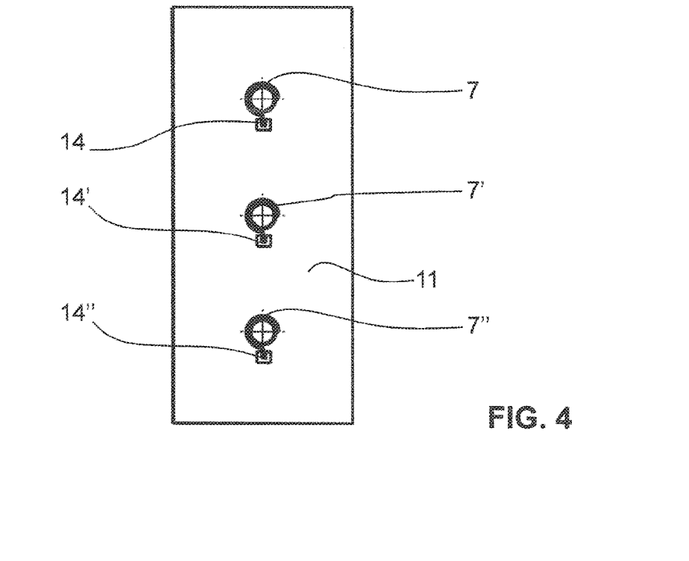
FIG. 4 shows a side view of the ventilation flap assembly shown in FIG. 1a without the actuating element and adjusting lever.

The ventilation flaps 2, 2', 2" in each case are acted upon by a spring force in the direction of their open position. To this end, in each case restoring springs 7, 7', 7" are provided which, for example, may be configured as torsional springs and in each case are fastened with a first end to the fastening pin 21, 21', 21" and with a second end to a spring holder 14, 14', 14" (FIG. 4). The spring holders 14, 14', 14" are arranged on the outer face of the frame 1 in the regions of the mounting holes 13, 13', 13".

In order to adjust the ventilation flaps 2, 2', 2" an actuating element 3 is provided, said actuating element in this case having an overall elongated, substantially rectangular shape. The acts at element 3 has a slot 31 which extends over a large proportion of the longitudinal extent of the actuating element 3. The longitudinal extent of slot 31 defines a direction of displacement a of the actuating element 3. Along the longitudinal extent of the slot 31 a plurality of drive elements 32, 32', 32", in this case three drive elements, are provided, said drive elements being formed in each case by one projection which protrudes perpendicularly from the surface formed by the slot 31. The drive elements 32, 32', 32" are arranged on a straight line and, in the present exemplary embodiment, at irregular intervals. In the direction of displacement a of the actuating element 3 the drive elements 32, 32', 32" additionally have different longitudinal extents. The drive elements 32, 32', 32" form in each case a first stop surface 33, 33', 33" which faces in the direction of the longitudinal extent of the actuating element 3 and thus faces in the direction of displacement a and a second stop surface 34, 34', 34" located perpendicular thereto, which faces toward the slot 31.

During the mounting of the ventilation flap assembly, the ventilation flaps 2, 2', 2" are inserted with their two respective fastening pins 21, 21', 21" into the mounting holes 13, 13', 13" of the frame 1. The restoring springs 7, 7', 7" are then attached such that they are respectively connected, on the one hand, to one of the fastening pins 21, 21', 21" and to one of the spring holders 14, 14', 14", on the other hand, so that a restoring force is produced in the direction of the open position of the respective ventilation flap 2, 2', 2". Subsequently, the actuating element 3 is attached such that the slot 31 is penetrated by the three fastening pins 21, 21', 21" attached to the ventilation flaps 2, 2', 2". The fastening pins 21, 21', 21" penetrate, therefore, in each case the side wall 11 of the frame 1, one of the restoring springs 7, 7', 7" and the slot 31 of the actuating element 3. Since the adjusting levers 4, 4', 4" are pressed onto the square coupling elements 22, 22', 22" attached to the fastening pins 21, 21', 21", the actuating element 3 is held between the adjusting levers 4, 4', 4" and the side wall 11 of the frame 1, but is freely displaceable in the direction of the longitudinal extent of the slot 31, i.e. in the direction of displacement a, over a specific region. The adjusting levers 4, 4', 4" in this case protrude with their protruding actuating regions 41, 41', 41" perpendicularly away from the rotational axes of the ventilation flaps 2, 2', 2" such that in the open position of the ventilation flaps 2, 2', 2" the actuating regions 41, 41', 41" in each case come to bear against the same side of the actuating element 3 as the drive elements 32, 32', 32".

The mode of operation of the ventilation flap assembly is clearly visible, in particular, in FIGS. 1a to 1d and/or 2a to 2d in which different positions of the actuating element 3 relative to the frame 1 and correspondingly different positions of the ventilation flaps 2, 2', 2" are shown.

Figure 1A:
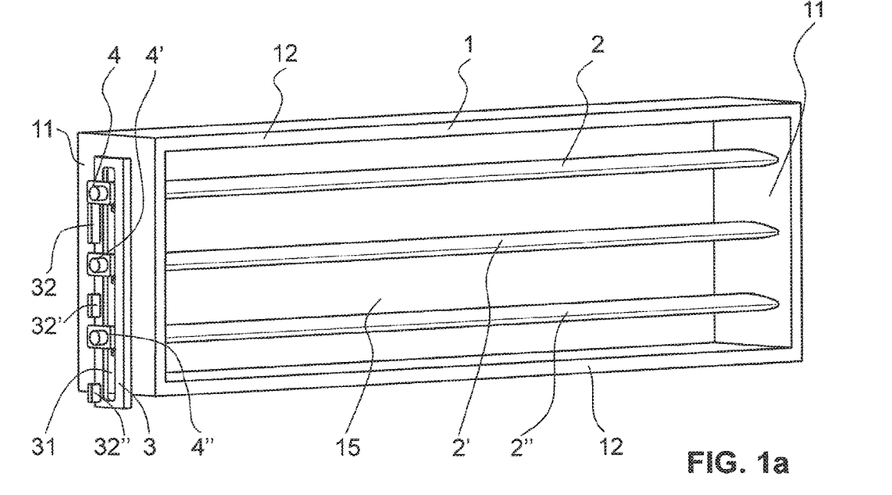
FIG. 1a shows a perspective view of a ventilation flap assembly according to a first embodiment according to the invention, wherein the actuating element adopts a basic position.
Figure 1B:
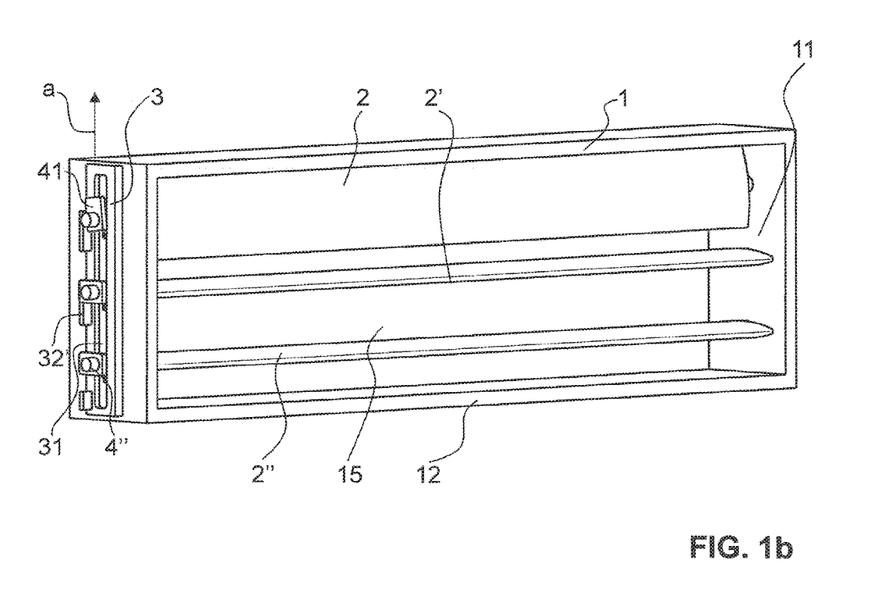
FIG. 1b shows a perspective view of the ventilation flap assembly of FIG. 1a, wherein the actuating element adopts a first intermediate position.
Figure 2A:
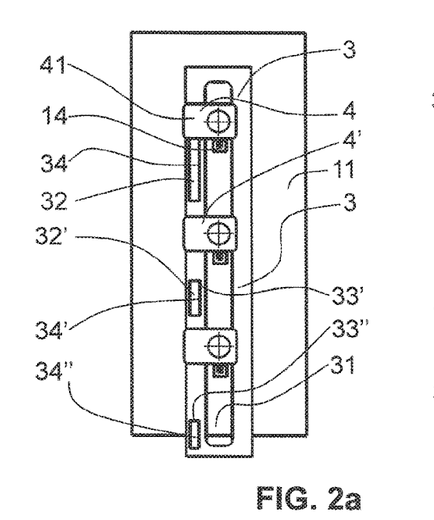

In the initial position shown in FIGS. 1a and 2a, all three ventilation flaps 2, 2', 2" are in their respective open position due to the spring action of the restoring springs 7, 7', 7" so that a maximally large quantity of air may flow through the air through-opening 15. The actuating element 3 in this initial position exerts no force and, in particular, no torque on the adjusting levers 4, 4', 4".

Figure 2B:
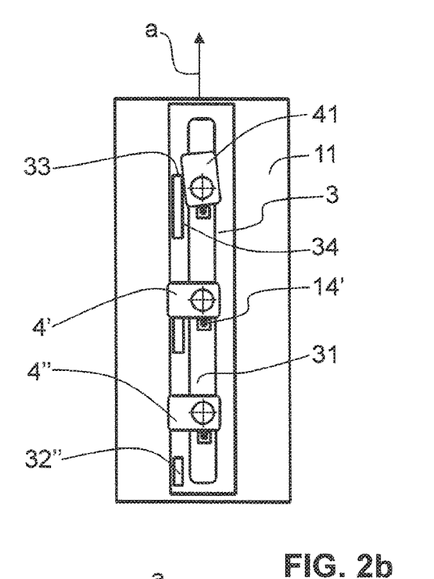
FIG. 2b shows a side view of the ventilation flap assembly shown in FIG. 1b.

In the situation shown in FIGS. 1b and 2b, in comparison with FIG. 1a/2a, the actuating element 3 is displaced slightly forward in the direction of displacement a. During the displacement, the drive element 32 arranged foremost in the direction of displacement a has come into contact with its first stop surface 33 on the actuating region 41 of the adjusting lever 4, of the ventilation flap 2 arranged uppermost in FIG. 1b, and thereby exerts a torque onto the ventilation flap 2, so that said ventilation flap has been rotated by ca. 90° into its closed position. The drive element 32 thus continues to bear against the adjusting lever 4, but with the second stop surface 34, and thereby prevents a rotation of the ventilation flap 2 back into its open position counter to the spring force of the restoring spring 7. The other two drive elements 32', 32" have not yet exerted any torque on the lower two ventilation flaps 2', 2", whereby said ventilation flaps are therefore still in their open position.

Figure 1C:
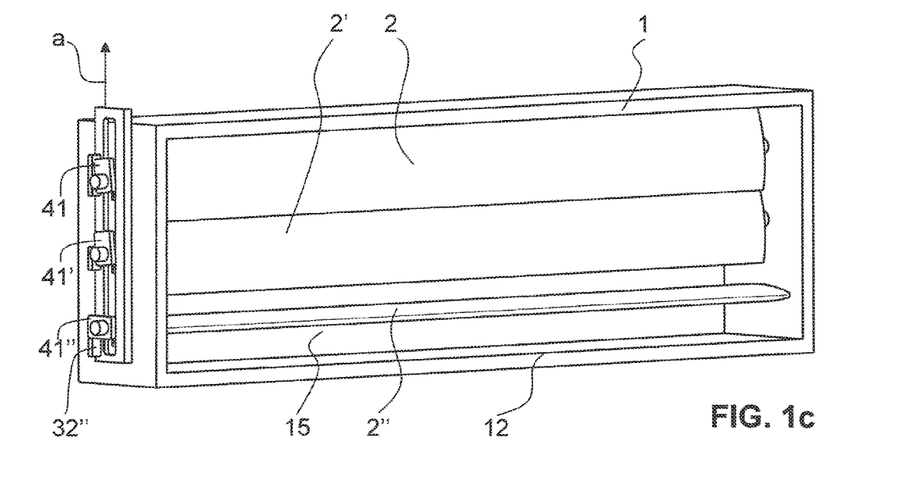
FIG. 1c shows a perspective view of the ventilation flap assembly of FIG. 1a, wherein the actuating element adopts a second intermediate position.
Figure 2C:
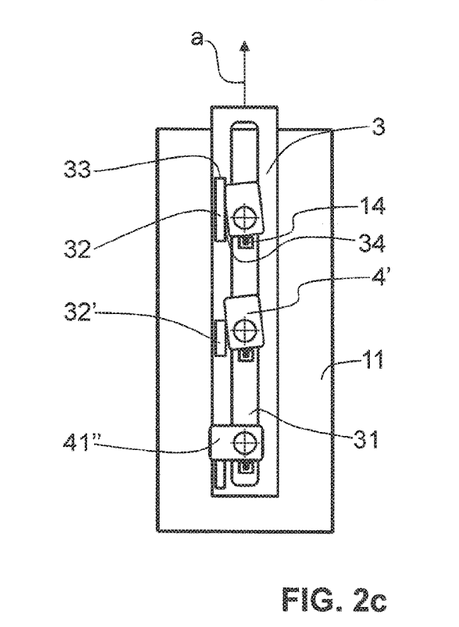
FIG. 2c shows a side view of the ventilation flap assembly shown in FIG. 1c.

In FIGS. 1c and 2c, in comparison with the FIGS. 1b and 2b, the actuating element 3 has been displaced further forward in the direction of displacement a, whereby the central drive element 32' has also come into contact with one of the adjusting levers 4' and the corresponding ventilation flap 2' has been adjusted into its closed position.

Figure 1D:
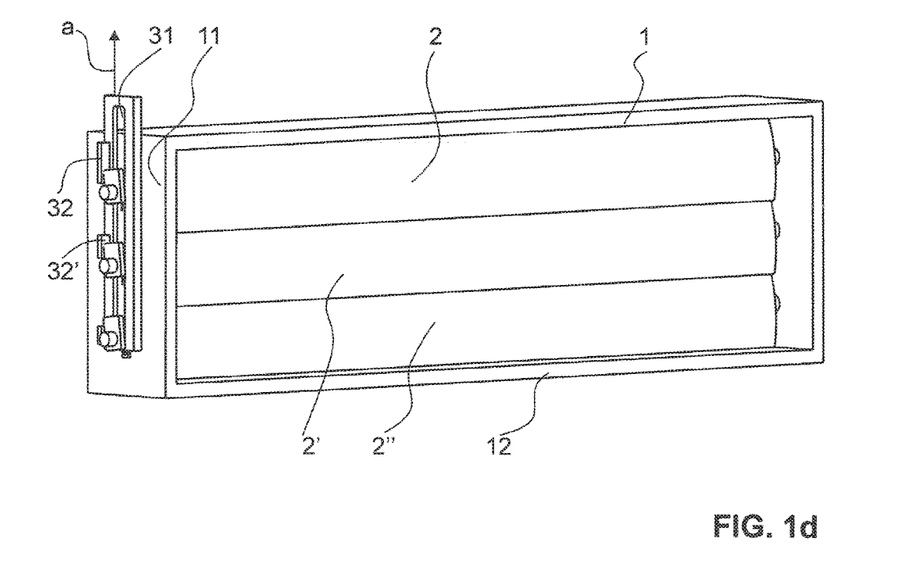
FIG. 1d shows a perspective view of the ventilation flap assembly of FIG. 1a, wherein the actuating element adopts an end position.
Figure 2D:
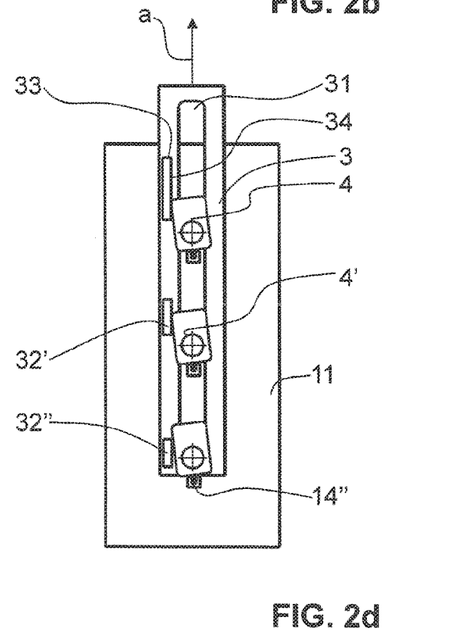
FIG. 2d shows a side view of the ventilation flap assembly shown in FIG. 1d.

In the situation shown in FIGS. 1d and 2d, the actuating element 3 is located in its maximum forward displaced position in the direction of displacement a. In this position, all three drive elements 32, 32' 32" come into contact with one respective adjusting lever 4, 4', 4" and in each case exert a torque thereon, counter to the restoring force of the restoring springs 7, 7', 7" so that all three ventilation flaps 2, 2', 2" are held in their closed position.

By the asynchronous, i.e. successive, adjustment of the three ventilation flaps 2, 2', 2" the maximum force to be applied for displacing the actuating element 3 is less than if all three ventilation flaps 2, 2', 2" were to be adjusted at the same time. This constitutes a substantial advantage, in particular with regard to the ventilation flap assembly being contaminated with dirt and being iced up, since thereby the requirements of a drive unit for displacing the actuating element 3 may be reduced.

By using different actuating elements 3 which differ merely in the arrangement of the drive elements 32, 32', 32" the ventilation flap assembly may be adapted in a very simple manner to different requirements relative to the adjustment behavior of the ventilation flaps 2, 2', 2". When the drive elements 32, 32', 32" are arranged, for example, at regular intervals, instead of at irregular intervals, in the direction of displacement a, a synchronous adjustment of the ventilation flaps 2, 2', 2" may be achieved instead of an asynchronous adjustment. By choosing a corresponding actuating element 3, the adjustment of the ventilation flaps 2, 2', 2" may thus be set as required and designed according to the ventilation flap assembly. Retrofitting an existing ventilation flap assembly with a new actuating element 3 is also possible, simply by the adjusting levers 4, 4', 4" being removed and being re-attached after replacing the actuating element 3.

Figures 5, 6:
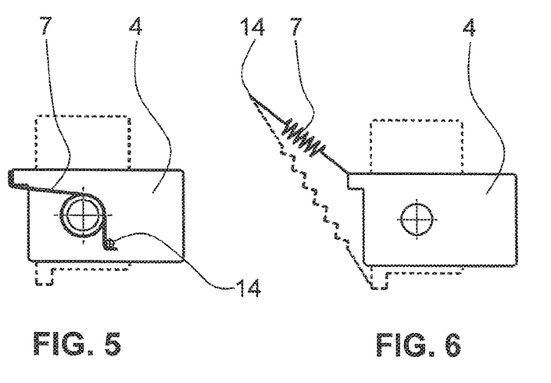
FIG. 5 shows a side view of the adjusting lever attached to a ventilation flap, with a restoring spring arrangement according to a first variant.
FIG. 6 shows a side view of the adjusting lever attached to a ventilation flap with a restoring spring arrangement according to a second variant.
Figure 7:
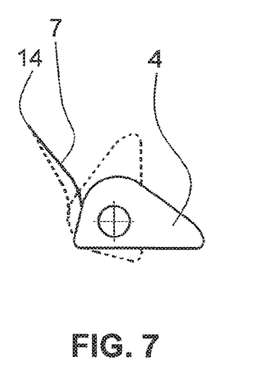
FIG. 7 shows a side view of the adjusting lever attached to a ventilation flap with a restoring spring arrangement according to a third variant.

In FIGS. 5 to 7, different variants of the restoring spring arrangements are shown, in order to subject the ventilation flaps 2, 2', 2" in the region of the fastening pins 21, 21', 21" or the adjusting levers 4, 4', 4" to a spring force acting in the direction of the open position. In the variant shown in FIG. 5, a rotary spring 7 is connected with a first end to a projection provided on the adjusting lever 4 and with a second end to a spring holder 14 fastened to the frame 1. In the variant of FIG. 6, a helical spring 7 is used instead of a torsion spring. FIG. 7 shows that the use of a leaf spring 7 is also possible, and in that the adjusting lever 4 does not necessarily have to be designed to be rectangular.

Figure 8:
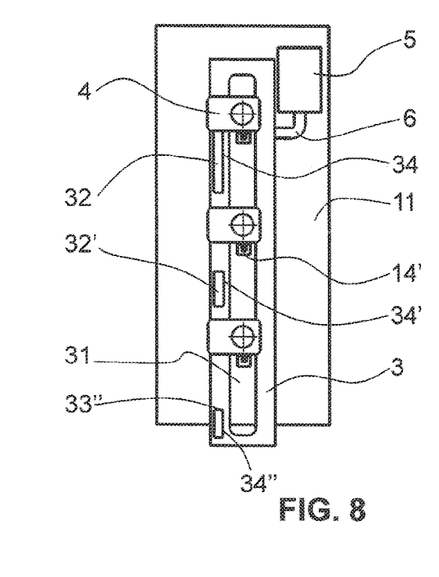
FIG. 8 shows a side view of a ventilation flap assembly according to a second embodiment according to the invention with an integrated drive unit.

In FIG. 8 an embodiment is shown in which a drive unit 5 for displacing the actuating element 3 forward is attached directly onto the side wall 11 of the frame 1. The drive unit 5 may be a simple electric motor which in this case is connected to the actuating element 3 via a drive transmission train 6.

Figure 9:
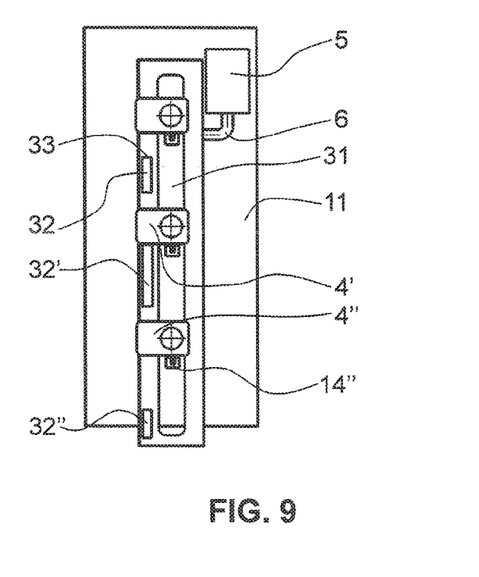
FIG. 9 shows a side view of a ventilation flap assembly according to a third embodiment according to the invention with an integrated drive unit.

In the embodiment shown in FIG. 9, the arrangement of the drive elements 32, 32', 32" on the actuating element 3 differs from those of FIGS. 1a to 8. The drive elements 32, 32', 32" in this case are arranged and configured such that firstly the central ventilation flap 2' is adjusted, then the uppermost ventilation flap is adjusted and finally the lowermost ventilation flap 2" is adjusted.

Figure 10:
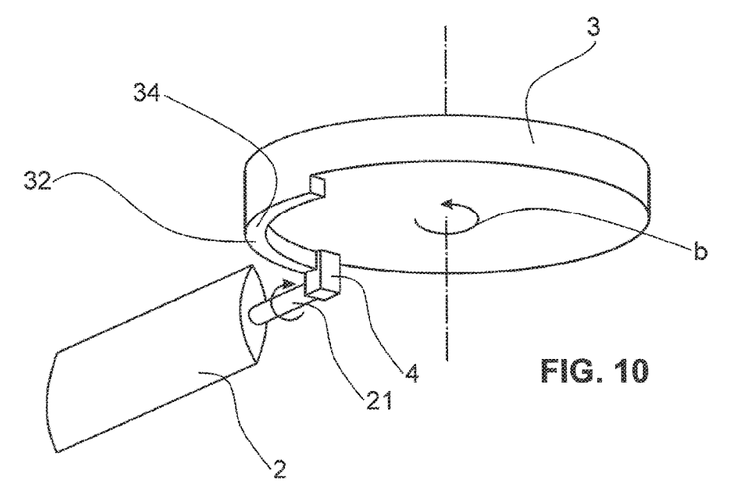
FIG. 10 shows a first perspective view of a ventilation flap assembly according to a fourth embodiment according to the invention, with an actuating element in the form of a rotating wheel, wherein only one ventilation flap is shown.
Figure 11:
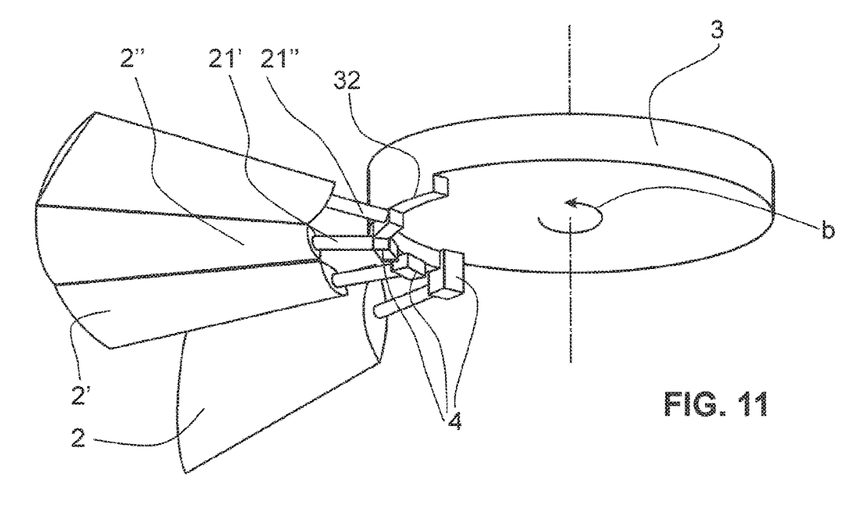
FIG. 11 shows a second perspective view of the ventilation flap assembly shown in FIG. 10, wherein a plurality of ventilation flaps are shown.

In the embodiment shown in FIGS. 10 and 11, the ventilation flaps 2, 2', 2" are arranged in a star-shaped manner and an actuating element 3 in the form of a rotating wheel is provided in the center. In order to adjust the ventilation flaps 2, 2', 2", the rotating wheel is rotated in a direction of rotation b. A single drive element 32 arranged on the rotating wheel comes into contact with the different ventilation flaps 2, 2', 2" one after the another, when the rotating wheel is rotated, and thus rotates said flaps one after the other from their open position into the closed position. Due to the second stop surface 34 of the drive element 32 extending over a large angular range, the ventilation flap 2 continues to be held in its closed position after the adjustment, even when the rotating wheel is rotated further for adjusting further ventilation flaps 2', 2".

In FIGS. 12 to 19 different possibilities for using and arranging the ventilation flap assembly according to the invention in a motor vehicle 8 in the form of an automobile are shown. Naturally, many other options are possible, even for other vehicle types.

In the motor vehicle 8 shown in FIG. 12, the ventilation flap assembly is arranged in the region of the front part 82, i.e. frontally in the case of the motor vehicle 8 being driven straight ahead as intended, in the region arranged below the engine hood 81 and oriented toward the front. The ventilation flap assembly forms in this case a cool air inlet opening 83. In such an arrangement, the forces of the driving wind acting on the ventilation flaps 2 are particularly high, whereby the present invention provides particular advantages due to the relatively small expenditure of force for adjusting the ventilation flaps 2.

Figure 13:
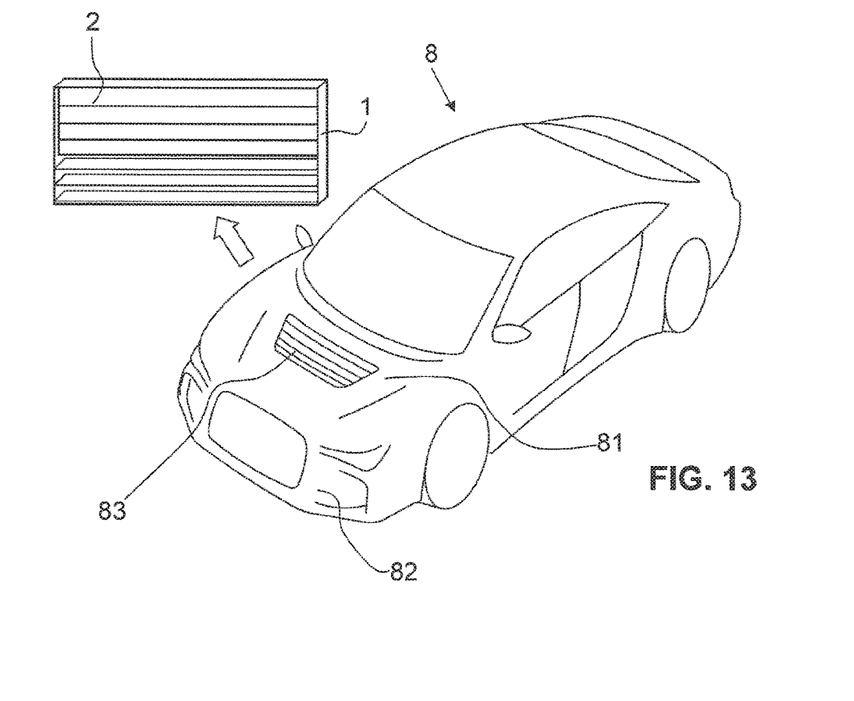
FIG. 13 shows a perspective view of a vehicle with a ventilation flap assembly according to the invention arranged in the engine hood.

In the motor vehicle 8, shown in FIG. 13, the ventilation flap assembly also forms a cool air inlet opening 83 which, however, is arranged inside the engine hood 81.

Figure 12:
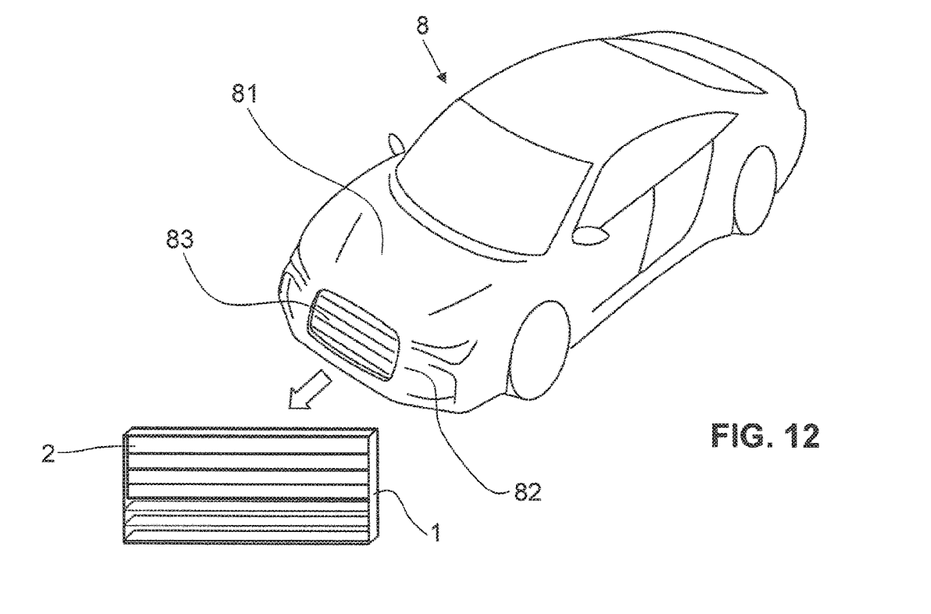
FIG. 12 shows a perspective view of a vehicle with a ventilation flap assembly with horizontal ventilation flaps according to the invention arranged in the front part.
Figure 14:
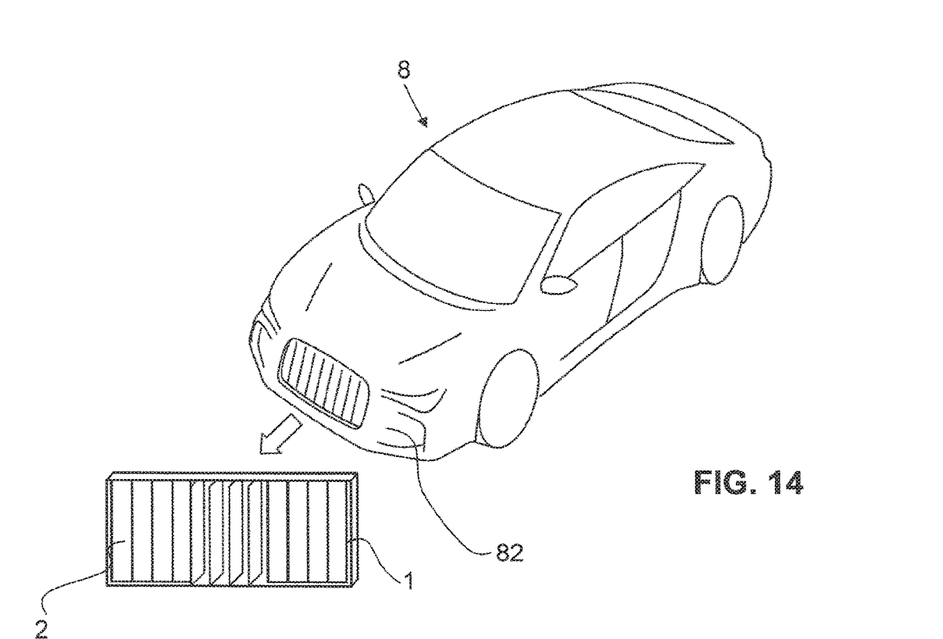
FIG. 14 shows a perspective view of a vehicle with a ventilation flap assembly with vertical ventilation flaps according to the invention arranged in the front part.

As a result, the variant of FIG. 14 differs from that of FIG. 12 in that the ventilation flaps 2 in this case are arranged vertically instead of horizontally in the frame 1. The direction of displacement a of the actuating element 3 for adjusting the ventilation flaps 2 in this case corresponds to the horizontal direction.

Figure 15:
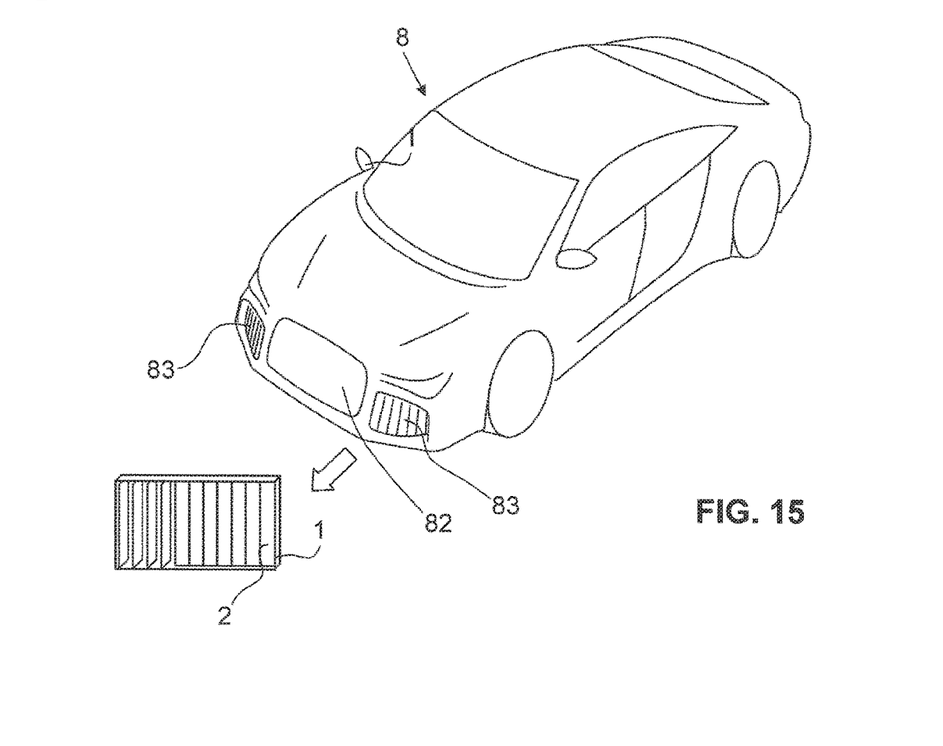
FIG. 15 shows a perspective view of a vehicle with two ventilation flap assemblies according to the invention arranged in the front part.

In the exemplary embodiment shown in FIG. 15, two ventilation flap assemblies are arranged to the side in the front part 82, said ventilation flap assemblies comprising ventilation flaps 2 which in each case extend in the vertical direction. Both ventilation flap assemblies in turn form cool air inlet openings 83.

Figure 16:
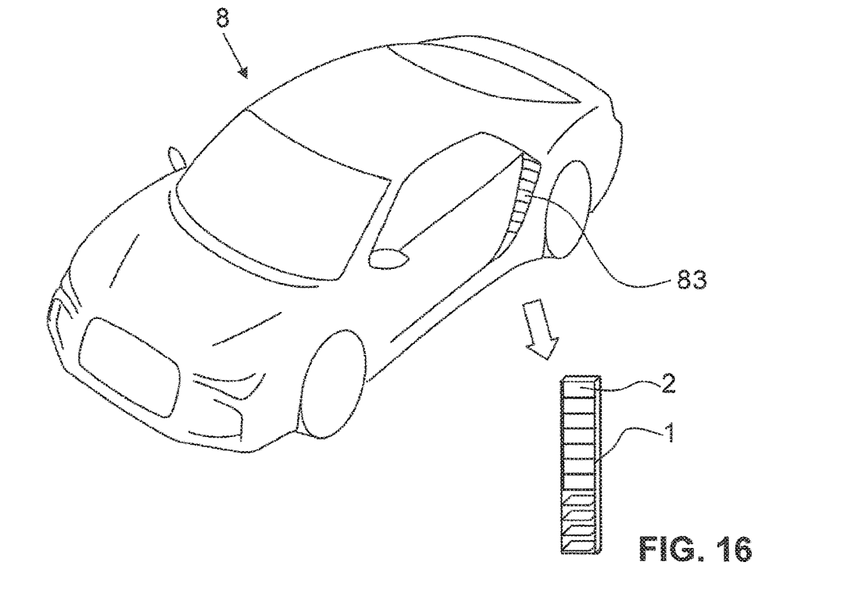
FIG. 16 shows a perspective view of a vehicle with a ventilation flap assembly according to the invention arranged in a rear vehicle region.

In FIG. 16 a motor vehicle 8 is shown in which in each case a ventilation flap assembly is provided on both sides in a rear region of the vehicle. The ventilation flap assemblies serve for closing and/or opening cool air inlet openings 83 which are provided, for example, for cooling the brakes of the rear wheels.

Figure 17:
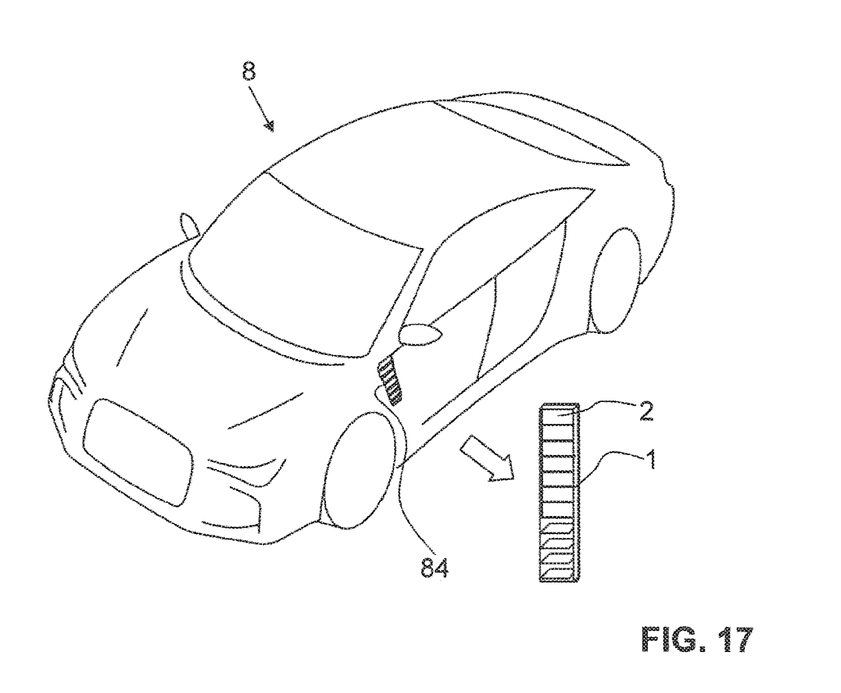
FIG. 17 shows a perspective view of a vehicle with a ventilation flap assembly according to the invention arranged to the side.

In the vehicle 8, which is shown in FIG. 17, the ventilation flap assemblies arranged on both sides serve for controlling the flowrate of an airflow respectively flowing through a waste air outlet opening 84.

Figure 18:
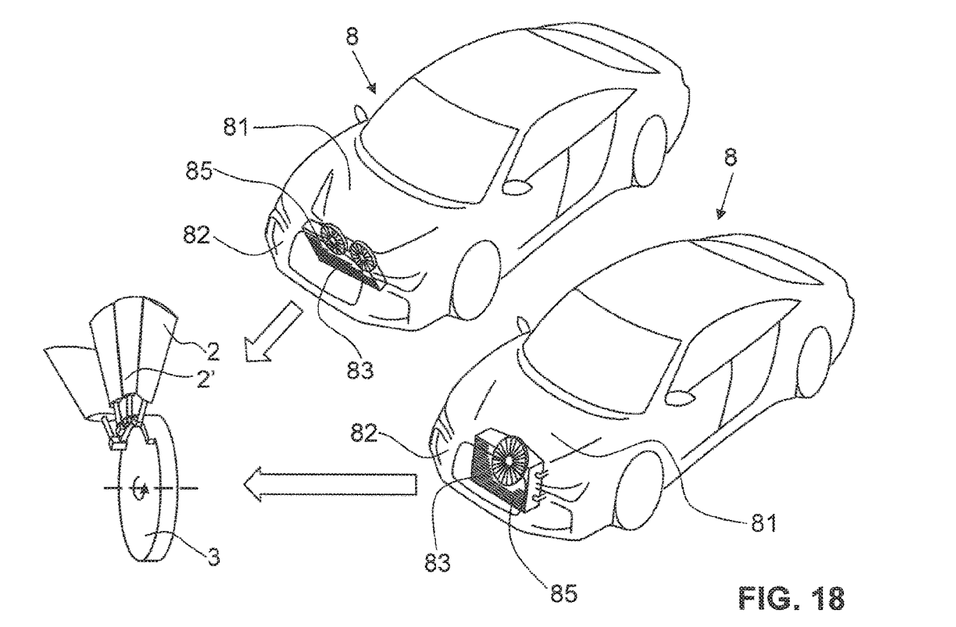
FIG. 18 shows perspective views of vehicles with in each case star-shaped ventilation flap assemblies according to the invention arranged in the region of a heat exchanger.

In FIG. 18, star-shaped ventilation flap assemblies, which in each case are arranged in the front part 82 of the vehicle 8 in a region behind a heat exchanger 85, are shown. The heat exchanger 85 serves for cooling the sub-assemblies of the vehicle 8 and the passenger compartment thereof. For each heat exchanger 85, one, two or more star-shaped ventilation flap assemblies, with in each case one actuating element 3, may be provided in the form of a rotating wheel for adjusting the ventilation flaps 2.

Figure 19:
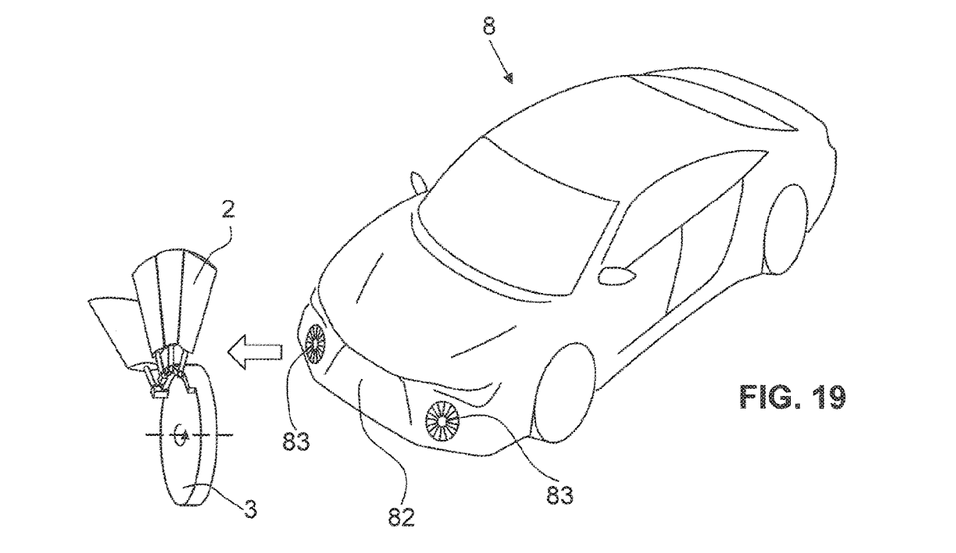
FIG. 19 shows a perspective view of a vehicle with two star-shaped ventilation flap assemblies according to the invention arranged in the front part.

In the vehicle 8 shown in FIG. 19, two ventilation flap assemblies with in each case ventilation flaps 2 arranged in a star-shaped manner are provided in the front part 82 for closing and opening correspondingly associated cool air inlet openings. The ventilation flap assemblies and, in particular, the ventilation flaps thereof 2 in this case are respectively arranged on the vehicle 8, clearly visible from outside. The asynchronous adjustment of the ventilation flaps 2 according to the invention in this case produces a specific aesthetic effect for the observer.

The invention is naturally not limited to the present embodiments and variants but a plurality of modifications is possible. Thus the restoring springs 7, 7', 7", for example, could be completely dispensed with. The ventilation flaps 2, 2', 2" could then, for example, in each case be latched in the open and closed positions or be held in the corresponding positions simply due to the friction on the frame 1. Rotating the ventilation flaps 2, 2', 2" back could then be achieved by a second actuating element instead of restoring springs, for example. The second actuating element may be configured to be the same as or similar to the first actuating element regarding the design and function, or may have any other type of design. Alternatively, the function of the restoring springs could in each case be responsible for a weight and/or a corresponding weight distribution of the ventilation flaps 2, 2', 2". The restoring force would then be based on the gravitational force or the driving wind. The ventilation flap assembly may also be arranged, for example, in the front wall separating the engine compartment from the passenger compartment or in the dashboard of the motor vehicle in order to control the supply of air into the passenger compartment. A plurality of further modifications is possible.

The invention claimed is:

1. A ventilation flap assembly for a vehicle, in particular a motor vehicle, comprising
   at least a first ventilation flap and a second ventilation flap which in each case can be adjusted from a first position into a second position, in order to allow the passage of a quantity of air, which differs in the second position in comparison with the quantity of air in the first position, through an air opening of the vehicle; and
   an actuating element for adjusting both the first and the second ventilation flap,
   wherein a first adjusting lever is attached to the first ventilation flap and a second adjusting lever is attached to the second ventilation flap,
   wherein the actuating element comprises one or more drive elements which in each case are formed by a projection provided on the actuating element and which, when the actuating element is actuated, firstly come into contact with the first adjusting lever in order to adjust the first ventilation flap thereby from its first position into its second position and subsequently come into contact with the second adjusting lever in order to adjust the second ventilation flap thereby from its first position into its second position, and wherein the actuating element is configured, when actuated, firstly to adjust the first ventilation flap from its first position into its second position, and only then to adjust the second ventilation flap from its first position into its second position.

2. The ventilation flap assembly as claimed in claim 1, wherein the drive element(s) are configured to hold the ventilation flaps, after the adjustment, in their respective second position.

3. The ventilation flap assembly as claimed in claim 2, wherein the drive element(s) have in each case a first stop surface in order to adjust at least one of the ventilation flaps from its first position into its second position, as well as a second stop surface in order respectively to hold said ventilation flap, after the adjustment, in its second position.

4. The ventilation flap assembly as claimed in claim 1, wherein the actuating element comprises a first drive element and a second drive element and wherein the first drive element serves for coming into contact with the first adjusting lever, in order to adjust the first ventilation flap thereby, and the second drive element serves for coming into contact with the second adjusting lever, in order to adjust the second ventilation flap thereby.

5. The ventilation flap assembly as claimed in claim 1, wherein the actuating element has a plurality of drive elements which are substantially arranged on a straight line.

6. The ventilation flap assembly as claimed in claim 1, wherein the actuating element has a plurality of drive elements which are substantially arranged on a circle.

7. The ventilation flap assembly as claimed in claim 1, wherein for adjusting the ventilation flaps the actuating element is displaceable relative thereto substantially in a straight line in a direction of displacement.

8. The ventilation flap assembly as claimed in claim 1, wherein the actuating element is configured as a rotating wheel.

9. The ventilation flap assembly as claimed in claim 1, wherein at least three ventilation flaps which are arranged in a star-shaped manner are provided.

10. The ventilation flap assembly as claimed in claim 1, wherein the ventilation flaps in each case are acted upon by a spring force acting in the direction of the first position.

11. The ventilation flap assembly as claimed in claim 1, wherein the first positions of the ventilation flaps in each case constitute open positions and the second positions of the ventilation flaps in each case constitute closed positions.

12. The ventilation flap assembly as claimed in claim 1, wherein the first and the second ventilation flaps are held together in a frame, and wherein this frame has an air through-opening which is able to be closed and/or opened by means of the ventilation flaps.

13. The ventilation flap assembly as claimed in claim 1, wherein the actuating element comprises a slot which is penetrated by a first element attached to the first ventilation flap and by a second element attached to the second ventilation flap.

14. A vehicle, in particular a motor vehicle, having a ventilation flap assembly comprising at least a first ventilation flap and a second ventilation flap which in each case can be adjusted from a first position into a second position, in order to allow the passage of a quantity of air, which differs in the second position in comparison with the quantity of air in the first position, through an air opening of the vehicle; and an actuating element for adjusting both the first and the second ventilation flap, wherein a first adjusting lever is attached to the first ventilation flap and a second adjusting lever is attached to the second ventilation flap, wherein the actuating element comprises one or more drive elements which in each case are formed by a projection provided on the actuating element and which, when the actuating element is actuated, firstly come into contact with the first adjusting lever in order to adjust the first ventilation flap thereby from its first position into its second position and subsequently come into contact with the second adjusting lever in order to adjust the second ventilation flap thereby from its first position into its second position, and wherein the actuating element is configured, when actuated, firstly to adjust the first ventilation flap from its first position into its second position, and only then to adjust the second ventilation flap from its first position into its second position.

\* \* \* \* \*